United States Patent
Wolfschoon-Pombo et al.

(10) Patent No.: US 11,185,084 B2
(45) Date of Patent: Nov. 30, 2021

(54) METHOD FOR THE MANUFACTURE OF A FLAVOR-ENHANCING COMPOSITION

(71) Applicant: Intercontinental Great Brands LLC, East Hanover, NJ (US)

(72) Inventors: Alan Wolfschoon-Pombo, Munich (DE); Thomas Spiegel, Munich (DE)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 62 days.

(21) Appl. No.: 16/497,490

(22) PCT Filed: Apr. 10, 2018

(86) PCT No.: PCT/IB2018/000416
§ 371 (c)(1),
(2) Date: Sep. 25, 2019

(87) PCT Pub. No.: WO2018/189583
PCT Pub. Date: Oct. 18, 2018

(65) Prior Publication Data
US 2021/0137131 A1 May 13, 2021

(30) Foreign Application Priority Data
Apr. 11, 2017 (GB) .................... 1705846

(51) Int. Cl.
A23C 9/142 (2006.01)
A23L 27/00 (2016.01)
A23L 27/40 (2016.01)

(52) U.S. Cl.
CPC .......... *A23C 9/1427* (2013.01); *A23C 9/1425* (2013.01); *A23L 27/40* (2016.08); *A23L 27/88* (2016.08)

(58) Field of Classification Search
CPC ..... A23C 9/1427; A23C 9/1425; A23L 27/88; A23L 27/40
(Continued)

(56) References Cited

U.S. PATENT DOCUMENTS 6,399,140 B1  6/2002 Allen et al.
7,867,520 B2  1/2011 Ikeda et al.
(Continued)

FOREIGN PATENT DOCUMENTS

EP   0536612 A1   4/1993
EP   1031288 A1   8/2000
(Continued)

OTHER PUBLICATIONS

International Search Report for International Application No. PCT/IB2018/000416, International Filing Date Apr. 10, 2018, 4 pages.
(Continued)

*Primary Examiner* — Brent T O'Hern
(74) *Attorney, Agent, or Firm* — Cantor Colburn LLP

(57) ABSTRACT

The present invention provides a method for the production of a flavor-enhancing composition, the method comprising the steps of:
i) providing a dairy liquid;
ii) nanofiltrating the dairy liquid to obtain a nanofiltration permeate;
iii) concentrating the nanofiltration permeate by reverse osmosis and/or evaporation to produce a flavor-enhancing composition, the flavor-enhancing composition comprising at least 50 wt % lactose by dry weight and having a K:Na ratio of at least 2:1, wherein nanofiltrating the dairy liquid uses a membrane having a molecular weight cut-off of from 300 Da to 800 Da.

19 Claims, 1 Drawing Sheet

(58) Field of Classification Search
USPC .......................................................... 426/649
See application file for complete search history.

(56) References Cited

U.S. PATENT DOCUMENTS

2010/0062124 A1    3/2010  Phillips
2016/0324175 A1*  11/2016  Dudarev ................. A23L 27/84

FOREIGN PATENT DOCUMENTS

| EP | 2745704 A1 | 6/2014 |
| EP | 2745705 A1 | 6/2014 |
| WO | 2015099960 A1 | 7/2015 |

OTHER PUBLICATIONS

Salmenhaara, Oskari; "Separation of Ions from Acid Solutions by Nanofiltration"; Lappeentranta University of Technology, 2016, 74 pages.
Suarez, Eva et al.; "Partial demineralization of whey and milk ultrafiltration permeate by nanofiltration at pilot-plant scale"; Desalination, v. 198, 2006, p. 274-281.
Written Opinion for International Application No. PCT/IB2018/000416, International Filing Date Apr. 10, 2018, 6 pages.

* cited by examiner

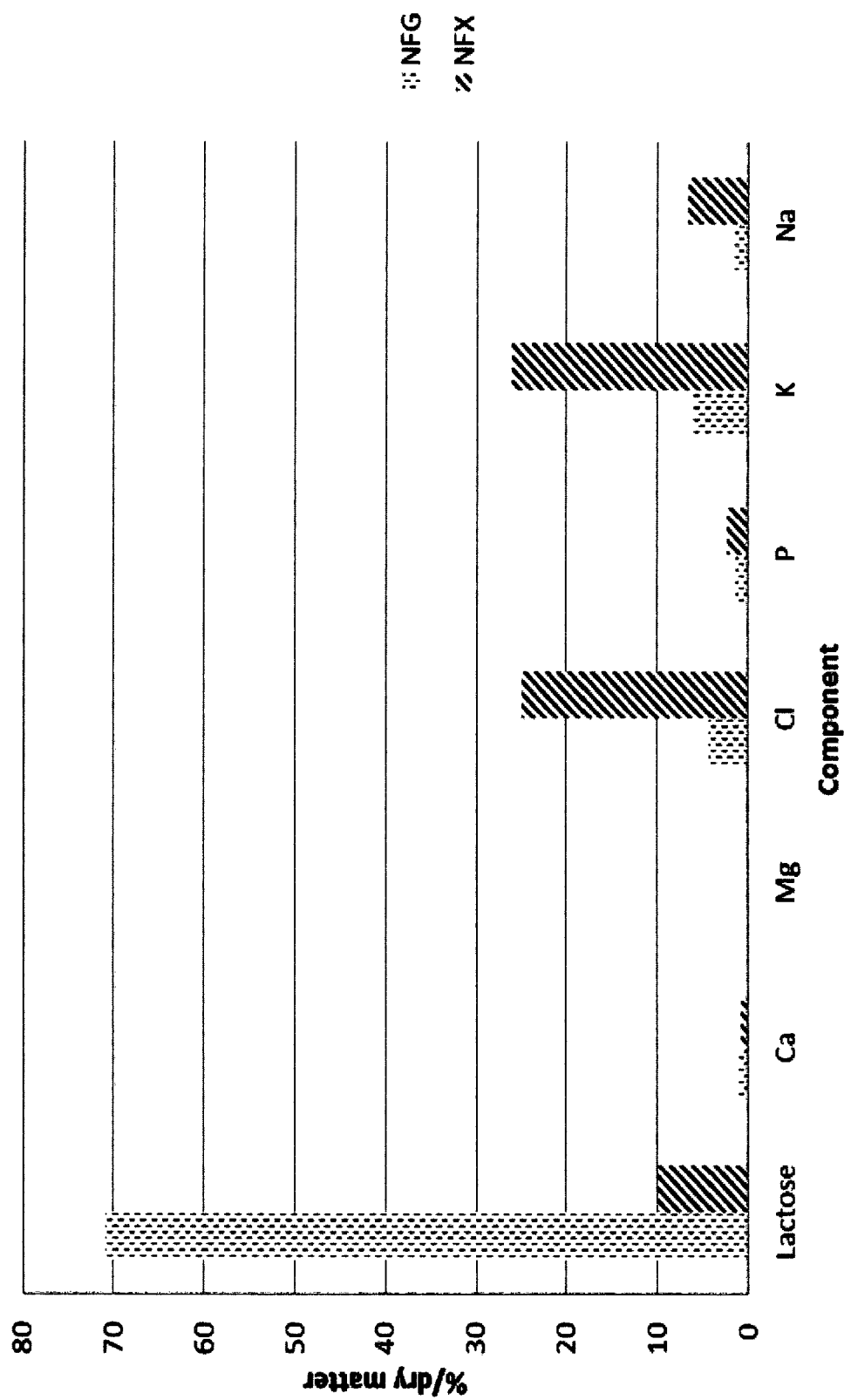

METHOD FOR THE MANUFACTURE OF A FLAVOR-ENHANCING COMPOSITION

FIELD

The present disclosure relates to a method for producing a flavor- or taste-enhancing additive and flavor-enhancing additives produced by said method. Specifically, the present disclosure relates to a method of producing a dairy-derived flavor-enhancing composition, the method comprising nanofiltration of a dairy liquid.

BACKGROUND

Sodium consumption is an area of keen focus for both health professionals and consumers. Excess sodium consumption can increase blood pressure leading to an increased risk of heart disease and stroke. Additionally, 75% of salt (NaCl) intake is derived from processed foods such as bread, cereal, canned soup, and ready meals. Accordingly, there is a desire for alternatives to table salt for use in processed foods, in order to reduce consumption of sodium. Sodium intake can be reduced by replacing salt with alternative salty tasting minerals.

Dairy liquids contain significant proportions of whey protein, lactose and mineral components. Whey is commonly seen as a waste and is commonly used as an animal feed. High production volumes and limited further processing results in an environmental disposal problem and a low commercial value of whey. In past years disposing whey into rivers or municipal sewage system, spraying onto fields or using it as animal feed were established practices of cheese and casein manufacturers. However, due to its high environmental impact authorities have forbidden these methods of disposal or charged high prices in return.

This has led to the development of further processing methods of whey in order to derive further value from this by-product. Whey protein concentrates are now commonly used in confectionary baking and the meat industry due to its nutritive, foaming and gelling properties. The main component of whey permeate is lactose which can be used in confectionery production. Lactose is also purified by crystallisation and used in the pharmaceutical industry.

Accordingly, the whey protein and lactose components are general considered as valuable components, whereas the mineral content is often seen as an undesirable waste product. Said mineral component is a potential salt replacement since it comprises relatively high potassium, chloride, calcium and phosphorous content but a low sodium content.

WO2015/099960 discloses a method of production of complex dairy salts by concentrating a whey by nanofiltration through a first filter with a pore size of 0.001-0.01 μm, subsequently further concentrating the first permeate by reverse osmosis using a membrane with a pore size of 0.0001-0.001 μm. In one embodiment WO2015/099960 teaches combining the reverse osmosis retentate with the nanofiltration retentate and further concentrating the mixture to provide complex dairy salts. The composition is adjusted by the combination of the NF permeate and the NF concentrate.

U.S. Pat. No. 6,399,140 discloses nanofiltering a whey or an ultrafiltration permeate to produce a whey salt powder. U.S. Pat. No. 6,399,140 teaches the use of nanofiltration membranes with molecular weight cut-offs (MWCO) of from 150 to 300 Da. The membranes used in U.S. Pat. No. 6,399,140 lead to a high lactose retention and a dry matter content of the permeate of from 0.1 to 1.0 wt %.

US 2010/0062124 teaches a method of producing a mineral whey product from a feed stream of milk or whey, comprising di-mineralizing the feed stream by membrane separation or ion exchange to produce a high potassium stream and di-mineralizing the high-potassium stream by precipitation and subsequent separation of calcium-phosphate. The high-potassium stream is then further concentrated and processed to provide the product. US 2010/0062124 discloses the use of Dow Filmtec NF45 membranes with a MWCO of from 150-300 Da. U.S. Pat. No. 7,867,520 discloses a similar process.

EP0536612 and EP1031288 disclose methods comprising nanofiltration and lactose crystallisation to produce low lactose dairy salts. EP0536612 teaches the use of a nanofiltration membrane with an MWCO of from 200 to 400 Da. The examples of EP1031288 use a Desal-5 membrane which has an MWCO of 150-300 Da.

EP2745705 teaches a method of producing a dairy salt by nanofiltrating a brine obtained by the electrodialysis of whey. EP2745705 teaches the use of a nanofiltration membrane with an MWCO of 300 Da.

There is a desire for an improved dairy-derived flavor-enhancing composition, there is also a desire for an improved or simplified method of producing the same. Moreover, there is a desire for a dairy-derived flavor-enhancing composition with improved nutritional composition.

SUMMARY

According to a first aspect, the present disclosure provides a method for the production of a flavor-enhancing composition, the method comprising the steps of:
  i) providing a dairy liquid;
  ii) nanofiltrating the dairy liquid to obtain a nanofiltration permeate;
  iii) concentrating the nanofiltration permeate by reverse osmosis and/or evaporation to produce a flavor-enhancing composition, the flavor-enhancing composition comprising at least 50 wt % lactose by dry weight and having a K:Na ratio of at least 2:1,
  wherein nanofiltrating the dairy liquid uses a membrane having a molecular weight cut-off of greater than 300 Da and less than or equal to 800 Da.

As discussed below, the method provides an improved flavor-enhancing composition with a high lactose content and a high potassium to sodium ratio. Surprisingly, the method allows the adjustment of the ratio of lactose to dairy minerals in a single efficient nanofiltration step.

BRIEF DESCRIPTION OF THE DRAWINGS

FIG. 1 shows the average of the values obtained in Table 4, demonstrating the balance of components obtained by the method disclosed herein.

DETAILED DESCRIPTION

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present disclosure relates to a method for the manufacture of a flavor-enhancing composition. Flavor-enhancing compositions are well-known components of food. Flavor-enhancing compositions are not necessarily themselves flavored but instead improve the flavor of products containing them. Table salt (NaCl) and monosodium glutamate (MSG) are the two most widely known and used flavor-enhancers. While both are commonly used they both contain significant amounts of sodium. There is a current push for consumers to reduce their sodium intake and therefore there is a push to find low-sodium alternative flavor enhancers.

The method of the present invention involves a series of steps. As will be appreciated, it is necessary to perform these steps in a specific order in order to achieve the beneficial effects. Nonetheless, in practice the steps may be conducted continuously and therefore simultaneously.

The method of the present disclosure involves the use of dairy liquids. Specifically, the first step is the provision of a dairy liquid. A dairy liquid is a liquid obtained from the milk of mammals, typically cows, sheep, goats and the like. Cow's milk is the most prevalent. Dairy liquids typically comprise whey protein, casein, minerals and lactose, together with any fat fraction. As such, the definition includes dairy derivatives such as sweet whey, sour whey, milk protein concentrate, total milk protein concentrate, whey protein concentrate, casein and the like as long as they are in liquid form.

The dairy liquid is in liquid forms such as solutions and suspensions. These aqueous liquids are important to allow good homogeneous mixing and for continuous processing. The dairy liquid may be formed by reconstitution of powder ingredients with water.

Typically the starting dairy liquid has a solids content of from 1 to 25 wt %, preferably 1 to 15 wt % and most preferably 5 to 7 wt %. The dairy liquid may optionally be pre-concentrated. Where the dairy liquid is pre-concentrated it may preferably have a solids content of 5 to 20 wt %, preferably 10 to 15 wt %, most preferably about 12 wt %. Preferably whey or UF-permeates of milk or whey are used, which have a total solids content of 5-7%. If some pre-concentrating is applied, total solids could be increased to 12%.

Preferably the dairy liquid comprises one or more of a milk, a fermented milk, a sweet whey, an acidic whey, or an ultra-filtration permeate thereof, more preferably the dairy component comprises a sweet whey or an acidic whey, or an ultra-filtration permeate thereof.

Whey is the main co-product of the cheese manufacturing process. Approximately 9 L whey accumulates while producing one kilo of hard cheese and 8 L whey out of soft cheese. When milk is acidified or treated with enzymes like chymosin, caseins separate from the milk followed by coagulation. The remaining translucent liquid is called whey and is about 85-95% of the milk volume.

Depending on the cheese manufacturing process the composition of whey can vary. Whey can be classified into sweet or sour whey depending on its pH level. Sweet whey is produced during manufacturing of hard, semi-hard and soft cheese with enzymes causing casein coagulation and its typical pH is between 5.8-6.6. The production of fresh cheese like quark, cream and cottage cheese produces acid whey with a pH around 4.3-5.3 whereby organic acids or lactic acid producing starter cultures were used for casein precipitation. Around 93 to 95% of whey is water regardless whether it is sweet or acid whey and contains water soluble milk components, which are 55% of the milk nutrients. Due to the different pH and production sweet and sour whey have differences in the mineral content and in the whey protein composition.

The mineral content of whey is still seen as a low value by-product. Advantageously the process of the present invention may be used to produce a valuable flavor-enhancing additive from this otherwise low value substance.

The second step of the present process is nanofiltrating the dairy liquid to obtain a nanofiltration permeate. Nanofiltration is a specific type of membrane filtration. Membrane filtration is a pressure driven separation technology and separates according to size. In membrane filtration a liquid feed is supplied to the feed side of a membrane. The rejected feed is called the retentate, consisting of particles larger than the membrane pore size, cannot pass through the membrane and, in batch processes, it may be recycled back into the feed vessel. Components which pass the membrane are called permeate or filtrate. The solute transport across the membrane is driven by convective flow due to the applied pressure and diffusion due to the concentration gradient between feed and permeate.

Membrane filtration techniques may be categorized by the pore size of the membranes used or their molecular weight cut-off (MWCO), both methods have limitations. While the pore size may provide a more precise classification method, in that it gives a specific value, it may be less accurate in terms of characterising the properties of the membrane. There are many properties which effect the retention value of a given membrane, such as the pH of the feed and the transmembrane pressure.

MWCO is characterized as the lowest molecular weight that would be more than 90% retained by the membrane. The characterization significance is limited because chemical properties influence the retention. It gives no further information about the rejection of molecules having a molecular weight below the MWCO. Since rejection versus molecular weight plots for membranes may not provide sharp cut-off values in some cases it is not possible to assign a specific value to the MWCO. In such cases membranes may be characterized by a MWCO range. For example a membrane may be characterized by an MWCO of 100-200 Da and another may be characterized as a 200-300 Da. Accordingly, although these membranes are characterized by MWCO ranges, and said ranges overlap since they share an end point, the skilled person would readily appreciate that said membranes are different. That is, it is the range that classifies the membrane, rather than the membrane being selected with an MWCO somewhere in that range.

Microfiltration membranes have the biggest pore size (>0.1 µm, >500 kDa) followed by Ultrafiltration (0.1-0.01 µm, 1-500 kDa) and Nanofiltration (0.01-0.001 µm, 0.1 kDa-1 kDa). Reverse osmosis membranes are without pores and reject all dissolved components while the pure solvent is able to permeate the membranes (<0.001 µm, <0.1 kDa).

Depending on the feed being processed, membrane filtration has advantages over other separation methods. Compared to thermal treatments, such as evaporation, it is operated at low temperatures, which makes it suitable for heat sensitive components. In case of milk components functional properties of proteins are not denaturized. Since no phase change is required the process is less energy demanding compared to condensers and evaporator units. Additionally, membrane separation has a certain but sometimes unpredicted selectivity due to different separation and rejection effects such as physical sieving, electrostatic exclusion and diffusion. The separation is influenced by several factors such as solution pH, concentration, ionic strength, the interaction of charged components as well as the charge of the membrane. Additionally, various factors affect the filtration process and product properties. For example the required process time, concentration factor and product yield are especially influenced by the transmembrane pressure, feed composition, membrane pore size and membrane material.

In the present process nanofiltrating the dairy liquid uses a membrane having a molecular weight cut-off of from 300 Da to 800 Da, preferably 400 Da to 800 Da, more preferably from 700 to 800 Da, most preferably about 750 Da. As discussed above such membranes may be categorized with an MWCO range rather than a specific value. A specific example of a suitable nanofiltration membrane is NFG Polyamide TFC membrane from Synder Filtration which is categorized as having an MWCO of 700-800 Da.

Using a membrane with too low an MWCO leads to permeates with solids mainly composed of monovalent ions (mainly chloride and potassium) and reduced levels of divalent ions, lactose and lactic acid. While these solids are described as salty, due to the relatively high concentration of potassium these permeates yield a slightly bitter off taste which reduces the consumer liking. Additionally, low MWCO membranes lead to lower flow rates and increased processing times.

Surprisingly, the present inventors have found that the use of a nanofiltration membrane with a larger MWCO yields permeates which are slightly salty, sour and sweet due to the low rejection values of lactose, lactic acid and minerals. Advantageously the higher lactose concentration acts as a taste-enhancing component as it may cover the bitterness of the mineral content. The preferred membranes have a better performance due to the higher permeate flow rates, shorter processing time, high dry matter and the high total concentration of minerals. Since the composition contains lactose, this permits the use of less additional sugar when used in other sweetened recipes.

The present inventors have surprisingly found that by using a nanofiltration membrane with a relatively large MWCO it is possible to obtain a permeate with advantageous lactose, sodium and potassium concentrations in a single separation step. Advantageously, the process of the present invention yields a product which may be used as a salt replacement directly. Preferably the process of the present invention does not involve a lactose crystallisation step, or the addition of lactose. That is, the process of the present invention yields and advantageous K:Na ratio and a lactose content which masks the bitterness often associated with high potassium salts.

Depending on the concentration and composition of the feed dairy liquid, the nanofiltration permeate of the invention has a solids content of at least 0.7% and at most 6%, preferably 1 to 3%.

The third step of the present method is concentrating the nanofiltration permeate by reverse osmosis and/or evaporation to produce a flavor-enhancing composition.

The flavor-enhancing composition has a K:Na ratio of at least 2:1. This can be measured by known techniques such as ICP-OES DIN EN ISO11885. Preferably the ratio is from 2:1 to 10:1, preferably from 3:1 to 7:1 and most preferably about 5:1. The ratio reflects the reduction in the sodium achieved with the obtained flavor-enhancing composition In order to obtain a solid flavor enhancing composition it is necessary to concentrate the nanofiltration permeate. Preferably concentration of the nanofiltration permeate is performed by reverse osmosis.

Optionally the method further comprises a step of drying the flavor-enhancing composition to form a solid, preferably a powder. Drying may be by freeze-drying or spray-drying or any other such technique as known in the art.

Advantageously, the NF-retentate of the present method provides a partially demineralized lactose concentrate. Lactose concentrates may be used as animal feed, even when relatively low purity. High purity lactose concentrates are of higher value as they may be used in the pharmaceutical industry as an excipient. Advantageously, the NF-retentate of the present invention may be of sufficient quality to be of use as an excipient for pharmaceutical formulations without further purification or an expensive process step.

Preferably the flavor-enhancing composition comprises at least 50 wt % lactose by dry weight and having a K:Na ratio of at least 2:1. Preferably the flavor-enhancing composition comprises by dry weight:
  a) 50 to 80 wt. lactose;
  b) 5 to 10 wt. % potassium;
  c) 0.8 to 2.5 wt. % sodium; and
  d) the balance counterions such as chloride, phosphate, lactate, citrate and non-protein nitrogen (NPN).

Non-protein nitrogen is a term in the art to refer collectively to components such as small peptides or urea, biuret, and ammonia, which are not proteins but can be converted into proteins by microbes in the stomach.

Preferably the flavor-enhancing composition comprises between 50 and 80 wt % lactose by dry weight, preferably from 60 to 70 wt %.

Preferably the transmembrane pressure of the nanofiltration step is from 5 to 50 bar, preferably 25 to 40 bar, preferably about 30 bar. While increasing the transmembrane pressure can increase flux it has also been found to effect the rejection rates of various dairy liquid components in different ways.

Preferably nanofiltrating the dairy liquid occurs at a temperature of from 5 to 20° C., preferably about 10 to 15° C. Alternatively, the nanofiltrating may occur at a temperature of 50 to 55° C. Advantageously, these temperature ranges reduce bacterial growth.

Preferably nanofiltrating the dairy liquid occurs at a pH of from 4.5 to 6.5, preferably at a pH of about 6.1.

In a further aspect, the present disclosure provides a flavor-enhancing composition produced according to the method disclosed herein.

In a further aspect, the present disclosure provides a flavor-enhancing composition comprising by dry weight:
  a) 50 to 80 wt. % lactose;
  b) 5 to 10 wt. % potassium;
  c) 0.8 to 2.5 wt. % sodium; and
  d) the balance counterions such as chloride, phosphate, lactate, citrate and non-protein nitrogen (NPN).

In a further aspect, the present disclosure provides a comestible item comprising the flavor-enhancing composition disclosed above.

The flavor-enhancing composition of the present invention is particularly suitable for use in comestible products comprising salt and lactose. For example, the flavor-enhancing composition of the present invention may be used in biscuits, crackers, cheese and the like. In particular, the flavor-enhancing composition is suitable for use in fresh cheese, cream cheese, processed cheese, ayran and the like.

In a further aspect, the present disclosure provides the use of the flavor-enhancing composition disclosed above as a salt replacement in a comestible item.

EXAMPLES

The invention will now be described in relation to the following non-limiting examples.

Mineral Content Analysis

A series of experiments were conducted in order to test the effect of MWCO on the mineral content of the permeate. The dairy liquids used were sweet and sour UF permeate. The sweet whey permeate is derived from the ultrafiltration of various whey streams, mainly from the production of hard cheese. Sweet UF whey was concentrated via evaporation to around 10% of solids. The sour permeate has 5% solids and was generated directly from the low fat fresh cheese production from the ultrafiltration of fermented milk.

The chemical composition of the sour and sweet ultrafiltrated cheese whey (UF permeate) are shown in Table 1.

TABLE 1

| | [% in dry matter] | | | |
|---|---|---|---|---|
| Composition | Sour UF permeate | 100% sweet UF permeate | 80:20 sweet to sour UF permeate | 60:40 sweet to sour UF permeate |
| Calcium | 2.42 | 0.62 | 0.83 | 1.09 |
| Citric Acid | 0.75 | 2.61 | 2.39 | 2.12 |
| Lactic Acid | 13.40 | 2.11 | 3.43 | 5.06 |
| Magnesium | 0.21 | 0.14 | 0.15 | 0.16 |
| Nitrogen TCA soluble | 0.55 | 0.50 | 0.51 | 0.51 |
| Chloride | 1.83 | 1.83 | 1.83 | 1.83 |
| Phosphorous | 1.42 | 0.71 | 0.80 | 0.90 |
| Potassium | 3.19 | 2.86 | 2.90 | 2.95 |
| Sodium | 0.75 | 0.69 | 0.70 | 0.71 |

TABLE 1-continued

| | [% in dry matter] | | | |
|---|---|---|---|---|
| Composition | Sour UF permeate | 100% sweet UF permeate | 80:20 sweet to sour UF permeate | 60:40 sweet to sour UF permeate |
| Fat | 0.00 | 0.90 | 0.80 | 0.67 |
| Lactose | 77.36 | 89.96 | 88.48 | 86.66 |
| Protein | 3.77 | 3.61 | 3.63 | 3.66 |
| pH [ ] | 4.72 | 5.75 | 5.53 | 5.18 |
| dry matter [g/100 g] | 5.30 | 9.96 | 9.03 | 8.10 |

Two different membranes NFX and NFG from Synder Filtration (California, USA) were used. The properties of the membranes are shown in Table 2.

TABLE 2

| Designation | Polymer | Nominal MWCO | Rejection | pH range at 25° C. |
|---|---|---|---|---|
| NFX | Polyamide TFC | 150-300 | Min 99% MgSO4; NaCl = 50% | 4-10 |
| NFG | Polyamide TFC | 700-800 | 50% MgSO4; NaCl = 15% | 4-10 |

Table 3 gives an overview of the chemical composition of the concentrated NF permeates and table 4 shows the composition of the dry matter in %. Filtration was conducted with a laboratory flat-sheet system (SIMATEC LSta60) at 15° C. and varying transmembrane pressure (TMP). The NF-permeates were concentrated 10-fold with a bench-scale evaporator (Rotavapor, Buechi).

TABLE 3

| Ratio sweet/sour UF permeate % | TMP [bar] | Type of membrane | Dry matter [g/100 g] | Lactose [g/100 g] | Ca [mg/kg] | Mg [mg/kg] | Cl [mg/kg] | P [mg/kg] | K [mg/kg] | Na [mg/kg] |
|---|---|---|---|---|---|---|---|---|---|---|
| 100/0 | 22.5 | NFX | 9.1 | 1.9 | 578 | 126 | 20503.1 | 2100 | 20200 | 5100 |
| 100/0 | 30 | NFG | 44.8 | 37.7 | 1880 | 588 | 18016 | 4200 | 22700 | 5610 |
| 100/0 | 30 | NFX | 9.3 | 1.9 | 565 | 116 | 20503.1 | 2370 | 21200 | 5200 |
| 100/0 | 37.5 | NFX | 7.7 | 1.3 | 439 | 86 | 20017.8 | 1750 | 19500 | 4860 |
| 80/20 | 15 | NFX | 6.8 | 0.3 | 383 | 32 | 17530.1 | 1490 | 18500 | 4580 |
| 80/20 | 15 | NFG | 45 | 30.8 | 3630 | 790 | 16620.8 | 5230 | 23300 | 5710 |
| 80/20 | 22.5 | NFG | 27.7 | 17 | 2920 | 590 | 17409.4 | 4470 | 22200 | 5360 |
| 80/20 | 22.5 | NFG | 34.6 | 23.2 | 3250 | 723 | 16317.5 | 4750 | 22600 | 5810 |
| 80/20 | 22.5 | NFG | 33.7 | 22 | 2950 | 640 | 16924.1 | 4620 | 22300 | 5390 |
| 80/20 | 22.5 | NFX | 5.7 | 0.1 | 164 | 13 | 16742.2 | 920 | 16410 | 4130 |
| 80/20 | 30 | NFX | 4.7 | 0.1 | 97 | 0 | 16135.6 | 520 | 14630 | 3710 |
| 80/20 | 30 | NFX | 6.2 | 0.2 | 210 | 17 | 16681.5 | 1240 | 17100 | 4390 |
| 60/40 | 15 | NFG | 42.9 | 29.9 | 5750 | 864 | 14679.7 | 5580 | 21500 | 5100 |
| 60/40 | 22.5 | NFX | 7.5 | 0.7 | 984 | 76 | 14679.7 | 2090 | 18200 | 4520 |
| 60/40 | 22.5 | NFX | 8.1 | 1 | 1250 | 101 | 14983 | 2430 | 19300 | 4820 |
| 60/40 | 30 | NFX | 6.2 | 0.5 | 644 | 50 | 14619.1 | 1480 | 16700 | 4190 |
| 60/40 | 30 | NFG | 31.2 | 20.6 | 4790 | 701 | 14679.7 | 4960 | 20900 | 4990 |
| 60/40 | 30 | NFG | 31.4 | 20.6 | 4820 | 698 | 14255.1 | 4950 | 20600 | 4960 |

The relatively small MWCO of the NFX membrane leads to low dry matter values in the evaporation concentrated NF-permeate of from 4.7 to 9.3 g/100 g whereas the large MWCO of the NFG membrane yields dry matter of from 27.7 to 51.6 g/100 g. The dry matter values for the concentrated permeate would be an order of magnitude lower.

were compared to a 0.5% NaCl and 5% lactose reference solution. A 0.5% NaCl solution was used as a reference for NFX permeates. It was focused on saltiness, sourness and bitterness compared to the reference solution. A scale to describe flavor attributes salty, sour and bitter is shown in table 5.

TABLE 4

| Ratio sweet/sour UF permeate % | TMP [bar] | Type of membrane | Lactose [%/DM] | Ca [%/DM] | Mg [%/DM] | Cl [%/DM] | P [%/DM] | K [%/DM] | Na [%/DM] |
|---|---|---|---|---|---|---|---|---|---|
| 100/0 | 22.5 | NFX | 20.8791 | 0.6 | 0.1 | 22.6 | 2.3 | 22.2 | 5.6 |
| 100/0 | 30 | NFG | 84.1518 | 0.4 | 0.1 | 4.5 | 0.9 | 5.1 | 1.3 |
| 100/0 | 30 | NFX | 20.4301 | 0.6 | 0.1 | 22.1 | 2.6 | 22.8 | 5.6 |
| 100/0 | 37.5 | NFX | 16.8831 | 0.6 | 0.1 | 26 | 2.3 | 25.4 | 6.3 |
| 80/20 | 15 | NFX | 4.41176 | 0.6 | 0 | 25.7 | 2.2 | 27.1 | 6.7 |
| 80/20 | 15 | NFG | 68.4444 | 0.8 | 0.2 | 3.7 | 1.2 | 5.2 | 1.3 |
| 80/20 | 22.5 | NFG | 61.3718 | 1.1 | 0.2 | 6.3 | 1.6 | 8 | 1.9 |
| 80/20 | 22.5 | NFG | 67.052 | 0.9 | 0.2 | 4.7 | 1.4 | 6.5 | 1.7 |
| 80/20 | 22.5 | NFG | 65.2819 | 0.9 | 0.2 | 5 | 1.4 | 6.6 | 1.6 |
| 80/20 | 22.5 | NFX | 1.75439 | 0.3 | 0 | 29.3 | 1.6 | 28.7 | 7.2 |
| 80/20 | 30 | NFX | 2.12766 | 0.2 | 0 | 34.1 | 1.1 | 30.9 | 7.8 |
| 80/20 | 30 | NFX | 3.22581 | 0.3 | 0 | 26.8 | 2 | 27.5 | 7.1 |
| 60/40 | 15 | NFG | 69.697 | 1.3 | 0.2 | 3.4 | 1.3 | 5 | 1.2 |
| 60/40 | 22.5 | NFX | 9.33333 | 1.3 | 0.1 | 19.7 | 2.8 | 24.4 | 6.1 |
| 60/40 | 22.5 | NFX | 12.3457 | 1.5 | 0.1 | 18.5 | 3 | 23.9 | 6 |
| 60/40 | 30 | NFX | 8.06452 | 1 | 0.1 | 23.8 | 2.4 | 27.2 | 6.8 |
| 60/40 | 30 | NFG | 66.0256 | 0.8 | 0.2 | 3.7 | 1.2 | 5.2 | 1.3 |
| 60/40 | 30 | NFG | 65.6051 | 1.5 | 0.2 | 4.5 | 1.6 | 6.6 | 1.6 |

The average of these values is shown in FIG. 1.

Sensorial Analysis

In order to assess the flavor effect of the samples taste tests were performed. The samples were tasted by internal R&D experts. The permeates were diluted to adjust a constant chloride content representing 0.5% salt (NaCl) equivalents. The Na content of the reference was 0.20%, i.e. the milk mineral solutions had about 50-65% less Na for the NFX samples and 40-55% less for the NFG samples. Permeates produced with NFG or NFX were compared in independent tasting session because of their different lactose concentrations and sweetness perception. NFG permeates

TABLE 5

| Grade | 2 | 1 | 0 | −1 |
|---|---|---|---|---|
| Salty | — | More | Same as reference | Less |
| Sour | Very | Slightly | Not | — |
| Bitter | Very | Slightly | Not | — |

The results of the taste test are shown in table 6 below.

TABLE 6

| Sweet permeate % | TMP [bar] | NFX Sample | Saltiness | Sourness | Bitterness | Na [%] | Cl [%] | Lactose [%] | Lactic acid [%] | K [%] |
|---|---|---|---|---|---|---|---|---|---|---|
| 100 | 37.5 | 5 | −1 | 0.75 | 0 | 0.07 | 0.30 | 0.2 | 0.17 | 0.3 |
| 100 | 22.5 | 12 | −0.75 | 0.75 | 0.25 | 0.08 | 0.30 | 0.29 | 0.18 | 0.3 |
| 100 | 30 | 17 | −0.25 | 0.5 | 0.5 | 0.08 | 0.30 | 0.28 | 0.21 | 0.31 |
| 80 | 15 | 6 | 1 | 1 | 1.25 | 0.08 | 0.30 | 0.05 | 0.25 | 0.32 |
| 80 | 30 | 7 | 0.5 | 0.75 | 0.75 | 0.07 | 0.30 | 0.02 | 0.14 | 0.28 |
| 80 | 30 | 10 | 0.5 | 0.75 | 0.5 | 0.08 | 0.30 | 0.04 | 0.23 | 0.31 |
| 80 | 22.5 | 13 | 0.5 | 1.25 | 0.5 | 0.07 | 0.30 | 0.03 | 0.2 | 0.3 |
| 60 | 30 | 2 | −0.25 | 0.75 | 0.25 | 0.09 | 0.30 | 0.1 | 0.19 | 0.35 |
| 60 | 22.5 | 3 | −0.25 | 1.25 | 0 | 0.09 | 0.30 | 0.15 | 0.23 | 0.38 |
| 60 | 22.5 | 15 | 0.25 | 1.5 | 0.5 | 0.10 | 0.30 | 0.19 | 0.25 | 0.39 |

| Sweet permeate % | TMP [bar] | NFG Sample | Saltiness | Sourness | Bitterness | Na [%] | Cl [%] | Lactose [%] | Lactic acid [%] | K [%] |
|---|---|---|---|---|---|---|---|---|---|---|
| 100 | 30 | 4 | 0.66 | 1 | 0 | 0.09 | 0.30 | 6.35 | 0.3 | 0.39 |
| 80 | 22.5 | 1 | 0 | 1 | 0.5 | 0.09 | 0.30 | 2.69 | 0.47 | 0.38 |
| 80 | 22.5 | 8 | 0.5 | 1.5 | 0 | 0.11 | 030. | 4.31 | 0.48 | 0.43 |
| 80 | 22.5 | 11 | 0.33 | 0.8 | 0 | 0.10 | 0.30 | 3.94 | 0.49 | 0.39 |
| 80 | 15 | 14 | 0.33 | 1 | 1 | 0.10 | 0.30 | 5.61 | 0.54 | 0.42 |

TABLE 6-continued

| 60 | 15 | 9  | 1    | 1.25 | 0    | 0.11 | 0.30 | 6.18 | 0.7  | 0.45 |
|----|----|----|------|------|------|------|------|------|------|------|
| 60 | 30 | 16 | 0.25 | 1.5  | 0    | 0.10 | 0.30 | 4.25 | 0.69 | 0.43 |
| 60 | 30 | 19 | 0.67 | 1.25 | 0.25 | 0.11 | 0.30 | 4.38 | 0.75 | 0.45 |

As demonstrated in the foregoing examples, the NFG permeates are slightly salty, sour and sweet due to the low rejection values of lactose, lactic acid and minerals. The advantage of the higher lactose concentration is the coverage of bitterness. NFG membranes have a better performance due to the higher permeate flow rates, shorter processing time, high dry matter and the high total concentration of minerals. To use NFG permeates as a salt replacer in products its high lactose concentration has to be compensated. The additional lactose of the NFG permeate could be balanced out by reducing the sugar contribution from another source. To obtain statistically reliable data of the NF permeate taste profile, a scale up is required to produce higher volumes of permeate for further sensory analysis. A membrane with an intermediate pore size should be applied to obtain acceptable flow rates and demineralization of the whey. Higher fluxes during filtration could be obtained by increasing the transmembrane pressure stepwise over the time or by increasing the temperature.

Alternative Membrane Examples

Nanofiltration was conducted with a spiral wound membrane Synder NFW Polyamide TFC with 300-500 MWCO at two different temperatures and a transmembrane pressure of 30 bar. The properties of all 3 membranes are shown in table 7.

TABLE 7

| Designation | Polymer | Nominal MWCO | Rejection | pH range at 25° C. |
|---|---|---|---|---|
| NFX | Polyamide TFC | 150-300 | Min 99% $MgSO_4$; NaCl = 50% | 4-10 |
| NFW | Polyamide TFC | 300-500 | Min 97% $MgSO_4$; NaCl = 40% | 4-9 |
| NFG | Polyamide TFC | 700-800 | 50% $MgSO_4$; NaCl = 15% | 4-10 |

The starting material was 100% sweet UF permeate as described in Table 1. The chemical composition of the NF-permeate was as follows:

TABLE 8

|  | NF at 50° C. |
|---|---|
| total solids of NF-permeate (%) | 2.5 |
| pH | 6.04 |
| w/w % in total solids |  |
| Nitrogen - 12% TCA soluble* | 1.20 |
| Lactose | 68.0 |
| Citric Acid | 0.4 |
| Lactic acid total | 6.4 |
| Chloride | 6.6 |
| Calcium | 0.6 |
| Magnesium | 0.1 |
| Phosphorus | 1.4 |
| Potassium | 8.0 |
| Sodium | 2.1 |

*NPN = non-protein nitrogen

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for the production of a flavor-enhancing composition, the method comprising the steps of:
    i) providing a dairy liquid;
    ii) nanofiltrating the dairy liquid to obtain a nanofiltration permeate;
    iii) concentrating the nanofiltration permeate by reverse osmosis and/or evaporation to produce a flavor-enhancing composition, the flavor-enhancing composition comprising at least 50 wt % lactose by dry weight and having a K:Na ratio of at least 2:1,
    wherein the nanofiltrating the dairy liquid uses a membrane having a molecular weight cut-off of from 700 Da to 800 Da.

2. The method according to claim 1, wherein the dairy liquid comprises one or more of a milk, a fermented milk, a sweet whey, or an acidic whey, or an ultra-filtration permeate thereof.

3. The method according to claim 1, wherein a transmembrane pressure of the nanofiltrating is from 5 to 50 bar.

4. The method according to claim 1, wherein the nanofiltrating the dairy liquid occurs at a temperature of from 5 to 20° C. or at a temperature of from 50 to 55° C.

5. The method according to claim 1, wherein the nanofiltrating the dairy liquid occurs at a pH of from 4.5 to 6.5.

6. The method according to claim 1, wherein the nanofiltration permeate has a solids content of at least 0.7%.

7. The method according to claim 1, wherein the method further comprises a step of drying the flavor-enhancing composition to form a solid.

8. The method according to claim 1, wherein flavor-enhancing composition comprises between 50 and 80 wt % lactose by dry weight.

9. A method for the production of a flavor-enhancing composition, the method comprising the steps of:
    i) providing a dairy liquid;
    ii) nanofiltrating the dairy liquid to obtain a nanofiltration permeate;
    iii) concentrating the nanofiltration permeate by reverse osmosis and/or evaporation to produce a flavor-enhancing composition, the flavor-enhancing composition comprising at least 50 wt % lactose by dry weight and having a K:Na ratio of at least 2:1,
    wherein the nanofiltrating the dairy liquid uses a membrane having a molecular weight cut-off of from 400 Da to 800 Da, wherein the flavor-enhancing composition comprises by dry weight:
    a) 50 to 80 wt. % lactose;
    b) 5 to 10 wt. % potassium;
    c) 0.8 to 2.5 wt. % sodium; and
    d) balance counterions and non-protein nitrogen.

10. A flavor-enhancing composition produced according to the method of claim 1.

11. A comestible item comprising the flavor-enhancing composition of claim 10.

12. A method comprising,
   using the flavor-enhancing composition of claim 10 as a salt replacement in a comestible item.

13. The method according to claim 9, wherein the dairy liquid comprises one or more of a milk, a fermented milk, a sweet whey, or an acidic whey, or an ultra-filtration permeate thereof.

14. The method according to claim 9, wherein the membrane has a molecular weight cut-off of from 700 to 800 Da.

15. The method according to claim 9, wherein a trans-membrane pressure of the nanofiltrating is from 5 to 50 bar.

16. The method according to claim 9, wherein the nanofiltrating the dairy liquid occurs at a temperature of from 5 to 20° C. or at a temperature of from 50 to 55° C.

17. The method according to claim 9, wherein the nanofiltrating the dairy liquid occurs at a pH of from 4.5 to 6.5.

18. The method according to claim 9, wherein the nanofiltration permeate has a solids content of at least 0.7%.

19. The method according to claim 9, wherein the method further comprises a step of drying the flavor-enhancing composition to form a solid.

* * * * *